(12) United States Patent
Miller et al.

(10) Patent No.: US 9,150,154 B2
(45) Date of Patent: Oct. 6, 2015

(54) SYSTEM AND METHOD TO MASK INCOMING CALLS FOR A COMMUNICATION DEVICE CONNECTED TO AN AUTOMOTIVE TELEMATICS SYSTEM

(71) Applicant: FORD GLOBAL TECHNOLOGIES, LLC, Dearborn, MI (US)

(72) Inventors: Thomas Lee Miller, Ann Arbor, MI (US); Brian Bennie, Sterling Heights, MI (US); Scott Alan Watkins, Canton, MI (US); Doron M. Elliott, Detroit, MI (US); Stephanie Lynne Janczak, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/232,056

(22) PCT Filed: Oct. 5, 2012

(86) PCT No.: PCT/US2012/058901
§ 371 (c)(1),
(2) Date: Jan. 10, 2014

(87) PCT Pub. No.: WO2013/052766
PCT Pub. Date: Apr. 11, 2013

(65) Prior Publication Data
US 2014/0203926 A1 Jul. 24, 2014

Related U.S. Application Data

(60) Provisional application No. 61/544,907, filed on Oct. 7, 2011.

(51) Int. Cl.
*H04W 4/04* (2009.01)
*B60Q 9/00* (2006.01)
(Continued)

(52) U.S. Cl.
CPC .............. *B60Q 9/008* (2013.01); *H04M 1/663* (2013.01); *H04M 1/72577* (2013.01); *H04W 4/046* (2013.01); *H04W 4/16* (2013.01); *H04W 4/027* (2013.01)

(58) Field of Classification Search
CPC ....... H04W 4/046; H04W 4/16; H04W 4/027; H04M 1/663; H04M 1/72577
USPC ................. 379/93.01, 90.01, 93.05; 340/436, 340/425.5, 667, 576; 455/456.4, 418; 701/36, 1, 70
See application file for complete search history.

(56) References Cited

U.S. PATENT DOCUMENTS

| 5,769,051 A | 6/1998 | Bayron et al. |
| 5,803,043 A | 9/1998 | Bayron et al. |

(Continued)

FOREIGN PATENT DOCUMENTS

| CN | 1795473 A | 6/2006 |
| CN | 101507250 A | 8/2009 |

(Continued)

OTHER PUBLICATIONS

International Search Report and Written Opinion for corresponding Application No. PCT/US12/58901, mailed Jan. 4, 2013, 8 pages.

(Continued)

*Primary Examiner* — Melur Ramakrishnaiah
(74) *Attorney, Agent, or Firm* — Jennifer M. Stec; Brooks Kushman P.C.

(57) ABSTRACT

In at least one embodiment, an apparatus for masking an in-coming call from a portable communication device (PCD) in a vehicle is provided. The apparatus comprises a controller that is configured to receive a driver status signal indicative of a driver being one of a primary driver and a secondary driver. The controller is further configured to transmit a first signal to a PCD to block a notification of an incoming call in the event the driver status signal indicates that the driver is the secondary driver.

16 Claims, 4 Drawing Sheets (51) Int. Cl.
*H04M 1/663* (2006.01)
*H04W 4/16* (2009.01)
*H04M 1/725* (2006.01)
*H04W 4/02* (2009.01)

(56) References Cited

U.S. PATENT DOCUMENTS

| | | | |
|---|---|---|---|
| 6,028,537 | A | 2/2000 | Suman et al. |
| 6,198,996 | B1 | 3/2001 | Berstis |
| 6,271,745 | B1 | 8/2001 | Anzai et al. |
| 6,353,778 | B1 | 3/2002 | Brown |
| 6,386,007 | B1 | 5/2002 | Johnson et al. |
| 6,411,899 | B2 | 6/2002 | Dussell et al. |
| 6,430,488 | B1 | 8/2002 | Goldman et al. |
| 6,518,882 | B2 | 2/2003 | Reese et al. |
| 6,675,082 | B2 | 1/2004 | Galli et al. |
| 6,690,956 | B2 | 2/2004 | Chua et al. |
| 6,741,920 | B1 | 5/2004 | Otto |
| 6,772,061 | B1 | 8/2004 | Berthiaume et al. |
| 6,952,156 | B2 | 10/2005 | Arshad et al. |
| 6,983,170 | B2 | 1/2006 | Stulberger |
| 6,998,956 | B2 | 2/2006 | Dix |
| 7,006,914 | B1 | 2/2006 | Cahoon |
| 7,075,409 | B2 | 7/2006 | Guba |
| 7,471,929 | B2 | 12/2008 | Fujioka et al. |
| 7,505,784 | B2 | 3/2009 | Barbera |
| 7,697,917 | B2 | 4/2010 | Camp, Jr. et al. |
| 7,757,803 | B2 | 7/2010 | Fiske et al. |
| 7,957,773 | B2 | 6/2011 | Chua et al. |
| 7,959,177 | B2 | 6/2011 | Fiske et al. |
| 8,050,815 | B2 | 11/2011 | Perry et al. |
| 8,131,205 | B2 | 3/2012 | Rosen |
| 8,275,422 | B2 | 9/2012 | Chen et al. |
| 8,577,548 | B2 | 11/2013 | Miller et al. |
| 8,971,927 | B2 | 3/2015 | Zhou et al. |
| 2002/0107302 | A1 | 8/2002 | Agness et al. |
| 2003/0134660 | A1 | 7/2003 | Himmel et al. |
| 2004/0198306 | A1 | 10/2004 | Singh et al. |
| 2004/0263316 | A1 | 12/2004 | Dix et al. |
| 2005/0100191 | A1 | 5/2005 | Harbach et al. |
| 2006/0114101 | A1 | 6/2006 | Schambeck et al. |
| 2007/0072616 | A1 | 3/2007 | Irani |
| 2007/0120948 | A1 | 5/2007 | Fujioka et al. |
| 2007/0124043 | A1 | 5/2007 | Ayoub et al. |
| 2009/0111422 | A1 | 4/2009 | Bremer et al. |
| 2009/0174560 | A1 | 7/2009 | Ahmad et al. |
| 2009/0195376 | A1 | 8/2009 | Miller et al. |
| 2009/0298482 | A1* | 12/2009 | Yen et al. ............... 455/414.2 |
| 2009/0312902 | A1 | 12/2009 | Miller et al. |
| 2009/0312914 | A1 | 12/2009 | Miller et al. |
| 2010/0035632 | A1 | 2/2010 | Catten |
| 2010/0227629 | A1 | 9/2010 | Cook et al. |
| 2011/0009107 | A1 | 1/2011 | Guba et al. |
| 2011/0021234 | A1 | 1/2011 | Tibbitts et al. |
| 2011/0039581 | A1 | 2/2011 | Cai et al. |
| 2011/0077032 | A1 | 3/2011 | Correale et al. |
| 2011/0105082 | A1 | 5/2011 | Haley |
| 2011/0109468 | A1* | 5/2011 | Hirschfeld et al. ........... 340/670 |
| 2011/0137520 | A1* | 6/2011 | Rector et al. ................ 701/36 |
| 2011/0151842 | A1 | 6/2011 | Olincy et al. |
| 2011/0257973 | A1 | 10/2011 | Chutorash et al. |
| 2011/0275321 | A1 | 11/2011 | Zhou et al. |
| 2012/0083668 | A1* | 4/2012 | Pradeep et al. ............... 600/300 |

FOREIGN PATENT DOCUMENTS

| | | |
|---|---|---|
| CN | 102066164 A | 5/2011 |
| CN | 102163367 A | 8/2011 |
| CN | 102177750 A | 9/2011 |
| CN | 102204350 A | 9/2011 |
| DE | 19961619 A1 | 6/2001 |
| GB | 2273580 A | 6/1994 |
| WO | 2011057217 A2 | 5/2011 |

OTHER PUBLICATIONS

International Preliminary Report for corresponding Application No. PCT/US12/58901, mailed Nov. 22, 2013, 15 pages.
Sync Powered by Microsoft, Supplemental Guide, Aug. 2009, 87 pages.
Ford Motor Company, "SYNC with Navigation System", Owner's Guide Supplement, SYNC System Version 1, Jul. 2007, 164 pages.
Ford Motor Company, "SYNC", Owner's Guide Supplement, SYNC System Version 1, Nov. 2007, 86 pages.
Ford Motor Company, "SYNC with Navigation System", Owner's Guide Supplement, SYNC System Version 2, Oct. 2008, 194 pages.
Ford Motor Company, "SYNC", Owner's Guide Supplement, SYNC System Version 2, Oct. 2008, 83 pages.
Ford Motor Company, "SYNC with Navigation System", Owner's Guide Supplement, SYNC System Version 3, Jul. 2009, 196 pages.
Patty Mattern, "Getting smarter at getting safer", University of Minnesota, UMNnews, Sep. 13, 2005, 2 pages.
English translation of DE 199 61 619 A1, Jun. 28, 2001, 5 pages.
Chinese Office Action for corresponding Application No. 201280049446.2, mailed May 6, 2015, 9 pages.

\* cited by examiner

SYSTEM AND METHOD TO MASK INCOMING CALLS FOR A COMMUNICATION DEVICE CONNECTED TO AN AUTOMOTIVE TELEMATICS SYSTEM

CROSS-REFERENCE TO RELATED APPLICATIONS

This application is the U.S. national phase of PCT Application No. PCT/US2012/058901 filed on Oct. 05, 2012, which claims the benefit of U.S. provisional Application No. 61/544,907, filed Oct. 7, 2011, the disclosures of which are incorporated in their entirety by reference herein.

TECHNICAL FIELD

Embodiments disclosed herein generally relate to a system and method for masking incoming call for a communication device connected to an automotive telematics system.

BACKGROUND

It is known to block a notification to a driver regarding an incoming communication to a vehicle such as a phone call. One example of this type of implementation is set forth below.

United States (U.S.) Publication No. 2012/0157069 to Elliot et al. provides a computer-implemented method that includes receiving, at a vehicle computing system, a notification that an incoming communication is being sent to a wireless device in communication with the vehicle computing system. The method also includes determining that a do not disturb function is active in the vehicle computing system and blocking a notification to a driver regarding the incoming communication. Finally, this method includes sending a command from the vehicle computing system to the wireless device to silence any notification that the wireless device provides in conjunction with the incoming communication.

SUMMARY

In at least one embodiment, an apparatus for masking an in-coming call from a portable communication device (PCD) in a vehicle is provided. The apparatus comprises a controller that is configured to receive a driver status signal indicative of the driver being one of a primary driver and a secondary driver. The controller is further configured to transmit a first signal to a PCD to block a notification of an incoming call in the event the driver status signal indicates that the driver is the secondary driver.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform any number of the operation(s) as disclosed herein.

It is recognized that one or more of the devices as set forth herein may include a computer program that includes a non-transitory computer readable medium operable to store computer logic embodied in computer program code encoded thereon for performing and number of the operations as set forth herein.

When a person places a call to another individual's cell phone, the person making the call does not know what type of environment the person he/she is calling is in. For example, the person they are calling may be operating a vehicle and be in a situation in which a call should not be responded to. A novice driver (e.g., a teen) may not have enough driving experience and/or discipline to ignore/reject the incoming call when operating a vehicle under certain driving situations.

Embodiments disclosed herein generally provides for a system and method for enabling a primary driver (e.g., parent, employer, consumer of valet services, etc.) to configure a vehicle controller(s) to mask and automatically reject all incoming calls for a particular portable communication device (PCD) that is operably coupled to the vehicle controller. The PCD may be a cell phone or other suitable device that enables an occupant to communicate with another person via wireless signals that are transmitted therebetween. The PCD may belong to a secondary driver (e.g., teenager, employee, valet driver, etc.). In addition, the system and method may also mask and automatically reject an incoming call to a PCD that is operably coupled to the vehicle controller based on vehicle environment. In another embodiment, a system and method is provided which enables an incoming call to be made to the vehicle occupant in moments in which the driver is detected to be in a drowsy state. In this case, the incoming call is allowed to be delivered to the PCD to alert or awaken the driver. These aspects and others will be discussed in more detail below.

Figure 1:
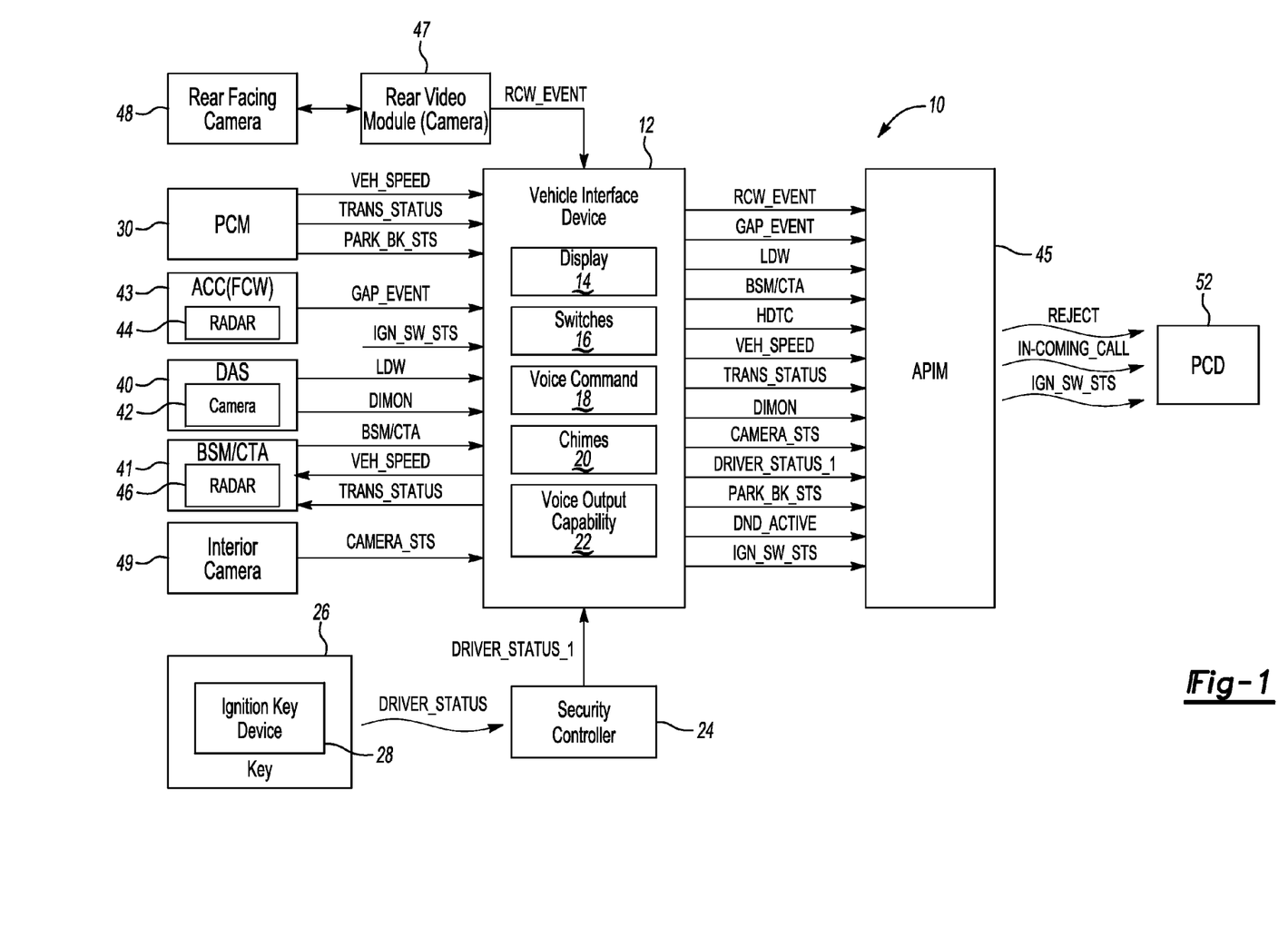
FIG. 1 depicts a system for masking incoming calls for a communication device connected to an automotive telematics system in accordance to one embodiment.

FIG. 1 depicts a system 10 for masking incoming calls in accordance to one embodiment. The system 10 generally comprises a vehicle interface device ("device") 12. The device 12 includes a display 14 that provides information related to the various states of vehicle functionality or visual warnings to the driver. For example, the display 14 may provide, but not limited to, a driver identification message during vehicle startup, various administrative menu options, a seatbelt warning message, a speed limit start up message, vehicle near top speed message, top speed message, driver identification speed warnings, one or more levels of visual warnings for tailgating and/or an inhibit electronic stability control ("ESC") and forward collision warning (FCW) message, an alert to notify the driver that the vehicle is too close to another vehicle or object, etc.

The device 12 also includes a plurality of switches 16, a voice recognition command interface 18, chimes 20, and voice output capability 22. The driver may toggle the switches 16 to view different messages and/or select various options. The voice recognition command interface 18 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System," filed Dec. 31, 2003.

The chimes 20 may audibly notify the driver when predetermined vehicle conditions have been met. In one example, the device 12 may activate the chimes 20 when the vehicle is near a top speed, the vehicle has achieved a top speed, the vehicle has exceeded the top speed, there is a low level of fuel in the fuel tank, when the vehicle is detected to be too close to another vehicle or obstacle to prevent a collision, when the traction control is enabled, etc. In one example, the voice output capability 22 enables the device 12 to transmit audio signals to the driver in the manner, but not limited to, that described in the '440 publication. In one example, the switches 16 may be positioned within the display 14 such that the display 14 and the switches 16 function as a touch screen. The switches 16 may be implemented as alpha-numeric characters. While the display 14, the switches 16, the voice input command interface 18, chimes 20, and the voice output capability 22 are shown within the controller 12, it is contemplated that one or more of these mechanisms may be positioned exterior to the controller 12.

A security controller 24 is operably coupled to the device 12. While FIG. 1 generally illustrates that the security controller 24 is positioned outside of the device 12, other implementations may include the security controller 24 being implemented directly within the device 12. In general, one or more of the signals transmitted to/from the device 12 may be transmitted via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys 26. The device 12 may receive a signal IGN_SW_STS from a body controller (not shown) to determine the position of the ignition switch. The keys 26 may be tagged or associated with a primary driver or a secondary driver of the vehicle. The primary driver (or administrative driver) may be a parent, employer, or other suitable person who exercises complete control over the vehicle. The secondary driver may be a teenager, a valet, an employee, a technician or other person who must abide by vehicle parameters established by the primary driver. The key 26 includes an ignition key device 28 embedded therein for wirelessly communicating with the vehicle. The ignition key device 28 comprises a transponder (not shown) having an integrated circuit and an antenna. The transponder is adapted to transmit an electronic code as a signal DRIVER_STATUS to a receiver (not shown) in the security controller 24. Data on the signal DRIVER_STATUS may be indicative of which driver (e.g., primary or secondary) is driving the vehicle. The signal DRIVER_STATUS may be in the form of radio frequency (RF) based signal or radio frequency identification (RFID) tag that corresponds to binary data. The security controller 24 determines if additional data in the signal DRIVER_STATUS matches predetermined data stored therein (e.g., in a look up table of the security controller 24) prior to allowing the vehicle to start for anti-theft purposes. A powertrain control module (or engine controller) 30 allows the vehicle to start the engine in the event the data on the signal DRIVER_STATUS matches the predetermined data.

The security controller 24 may transmit a signal DRIVER_STATUS_1 to indicate whether the particular driver is the primary driver or the secondary driver to various vehicle controllers or modules as either digital data on the data communication bus or hardwired signals. Prior to the security controller 24 transmitting the signal DRIVER_STATUS_1, the primary and secondary keys are learned to the security controller 24. The learning and programming of the keys 26 as either a primary or a secondary key is set forth in U.S. Pat. No. 7,868,759 ("the '759 patent") to Miller et al., which is hereby incorporated by reference in its entirety. It is recognized that the security controller 24 may be a passive anti-theft controller as set forth in the '759 patent. It is also recognized that security controller 24 as set forth in FIG. 1 of the present disclosure may be implemented as a passive-entry-passive start (PEPS) controller as set forth in the '759 patent.

The engine controller 30 is operably coupled to the device 12. The device 12 transmits an authorization signal (not shown) to the engine controller 30 in response to determining that the key 26 is authorized to start the vehicle. The engine controller 30 is configured to provide a signal VEH_SPEED over the data communication bus to the device 12. The signal VEH_SPEED corresponds to the speed of the vehicle. The engine controller 30 is also configured to provide a signal TRANS_STATUS over the data communication bus to the device 12. The signal TRANS_STATUS corresponds to the transmission status of the vehicle (e.g., whether the vehicle is in Park, Neutral, Drive, Low (PRNDL)). Alternatively, the engine controller 30 is configured to transmit a signal PARK_BK_STS over the data communication bus to the device 12.

The signal PARK_BK_STS corresponds to the park brake status of the vehicle (e.g., whether the park brake switch is engaged). The signal PARK_BK_STS may be of interest in the event the vehicle is equipped with a manual transmission. For example, if the signal PARK_BK_STS indicates that the park brake is engaged, this condition may correspond to the vehicle being in a parked state while the vehicle is equipped with the manual transmission. It may not be possible for a manual transmission based vehicle to provide transmission status. If the signal PARK_BK_STS indicates that the park brake is not engaged, such a condition may indicate that the vehicle is moving.

A driver alert system (DAS) module 40 is operably coupled to the device 12. The DAS module 40 uses a forward pointing camera 42 to determine what side of the vehicle is deviating from a lane or crossing over the lane to issue a warning. The DAS module 40 transmits a signal LDW to the device 12 for generating an audible and/or visual warning for the driver.

The DAS module 40 is configured to detect a shift in the driver's performance that may cause the vehicle to leave a lane or head off of the road. For example, the DAS module 40 measures a Driver's Impairment Monitor (DIMON) (or driver alert rating (DAR)) and assigns a rating to it. The DIMON tracks vehicle variation within the lane. In general, the DAS module 40 monitors the DIMON to detect a shift in the driver's performance that may be attributed to the driver exhibiting a drowsy or sleepy condition. In the event the DIMON rating is low (or below a pre-defined threshold), the DAS module 40 may transmit a signal DIMON to the device 12 for visually and/or audibly notifying the driver that the driver's performance indicates that the driver is in a "drowsy state." The alert is provided to the driver so that the driver can pull himself/herself out of the drowsy state.

A FCW module 43 is operably coupled to the device 12. The FCW module 43 is generally configured to detect when the vehicle may be on a path that leads to a forward collision (FC). The FCW module 43 generates a signal FCW_ALERT to indicate that the vehicle may be on a path that leads to a forward collision. One or more forward looking (FL) radars 44 are operably coupled to the FCW module 43. The FL radar 44 detects the presence/proximity of a vehicle (or object, obstacle, etc.) that may engage in a forward collision with the vehicle. The FL radar 44 transmits data indicative of the presence/proximity of the vehicle to the FCW module 43. In one example, the FCW module 43 may monitor the gap between the vehicle (i.e., the host vehicle) and another vehicle/object positioned ahead of the vehicle. The device 12 generally issues space alerts (audible and/or visual) to the driver in the event the vehicle is detected to be too close to a vehicle ahead of the host vehicle so the driver can take corrective action. The FCW module 43 may process the gap information and transmit a signal GAP_EVENT to the device 12 to trigger a forward collision alert warning/alert if the gap is below a predetermined gap amount. The FCW alert is a more heightened alert with respect to the space alert (or gap alert) as the vehicle is determined to be on a path that leads to a forward collision. In contrast, the gap alert corresponds to a point in which the host vehicle is detected to be too close to another vehicle/object. For example, the host vehicle may be tailgating with another vehicle.

A blind spot monitoring (BSM) and cross traffic alert (CTA) module 41 ("BSM module 41") is operably coupled to the device 12. One or more side radars 46 are operably coupled to the BSM module 41. The BSM module 41 is configured to determine whether a vehicle is in or entering into a location zone to either side (e.g., left or right side) of the vehicle based on information provided by the radar 46 (e.g., the radars 46 may include a radar positioned on a left rear corner of the vehicle and another radar positioned on a right rear corner of the vehicle). The location zone may be defined as the area extending rearward from an exterior mirror of the vehicle to a minimum of at least three meters from beyond a bumper of the vehicle. The location zone may extend up to 1.5 lanes from either the right or the left side of the vehicle. The BSM module 41 provides an alert to the driver when the vehicle is overtaking a subject vehicle or is stagnating within the location zone. The BSM module 41 transmits a signal BSM to the device 12 for generating a warning (e.g., audible and/or visual) to the driver. The warning is intended to notify the driver that a vehicle is located in the location zone or within close proximity to the vehicle.

The BSM module 41 may also perform a cross-traffic alert (CTA) operation. For example, a signal CTA as generated by the BSM module 41 may be generated in the event the vehicle is backing out of a parking spot and the side radar 46 detects that an on-coming vehicle is within the location zone. The BSM module 41 receives the signal VEH_SPEED and TRANS_STATUS from the device 12 (or directly from the PCM 30) to ascertain the vehicle speed and the transmission status of the vehicle. The BSM module 41 ascertains the vehicle speed and the transmission status to perform the CTA operation. In one example, a threshold speed of 3 kph or above and the vehicle being in reverse may be used as preconditions to perform the CTA operation.

In general, the device 12 uses the signal BSM to monitor for space management events. For example, the DAS module 40 is configured to trigger an event if the vehicle departs from either a left or right side of the lane and the BSM module 41 provides an alert to notify the driver that a vehicle is in the location zone. The device 12 uses such alerts to monitor for space management events.

A rear video module 47 may be operably coupled to the device 12. One or more rear facing cameras 48 may be coupled to the rear video module 47 to determine the presence/proximity of a rearward positioned vehicle (or object, obstacle, etc.) with respect to vehicle. The device 12 generally issues warnings (audible and/or visual) to the driver in the event the vehicle is detected to be on course or on a path that may lead to a rearward collision so that the driver can take corrective action. In the event the rear video module 47 detects that the vehicle is on a path that may lead to a rearward collision (or if a vehicle is rapidly approaching the vehicle from the rear), the rear video module 47 transmits a signal RCW_EVENT to the device 12 for generating an alert. It is recognized that a rearward facing radar may be used in place of the camera to monitor the presence of a rearward positioned vehicle with respect to the vehicle.

An interior camera 49 is also provided to capture an image of a driver to monitor if the driver is in the drowsy state as well. The interior camera 49 also includes hardware and software for generating a signal CAMERA_STS to provide status as to whether the driver is in a drowsy state. The interior camera 44 may provide the signal CAMERA_STS to indicate that that the driver is in a drowsy state. For example, the interior camera 49 may capture an image of the driver while in the vehicle and process such an image to determine whether the driver's eyes are closed for a period that exceeds a predetermined amount of time or whether the head of the driver leans to one side or the other or whether the driver's body droops in a downward position to determine when the driver is in the drowsy state to determine an alertness state of the driver.

In general, the device 12 is configured to assess information regarding space management of the host vehicle with respect to other vehicles/objects for one or more sides of the vehicle based on information received from at least one of the DAS module 40, FCW module 43, the BSM module 41, and the rear video module 48. An example of such an implementation is set forth in co-pending U.S. Ser. No. 13/091,474 filed on Apr. 21, 2011, to Miller et al. which is hereby incorporated by reference in its entirety. For example, the device 12 may be configured to determine if the vehicle is in a heavy traffic environment (or a high density traffic condition ("HDTC")) based on the information received from such modules. The device 12 may monitor the neighboring space around at least one side of the vehicle to determine when it is necessary to notify the driver that the host vehicle may be too close to a vehicle/object. The device 12 determines whether (i) the vehicle is in a high density traffic condition, (ii) the vehicle is in a cut-off or intentional merge condition (CIM), or (iii) the driver of the vehicle is distracted in order to efficiently generate alerts based on these conditions.

An auxiliary protocol interface module (APIM) 45 is operably coupled to the device 12. The APIM 45 may be wirelessly coupled to a PCD 52 via a Bluetooth protocol. The APIM 45 is part of an in-vehicle communication system (and includes at least one transmitter (not shown) and at least one receiver (not shown)) which interfaces with the PCD 52 to enable normal operation thereof, voice input control to perform a function with the PCD 52 so that the driver does not have to enter data directly into the PCD 52. The APIM 45 may allow the user to operate the PCD 52 either in a handheld mode (e.g., manual mode) or in a voice control mode (e.g., w/o touch input control). The APIM 45 may interface via switches (not shown) positioned within the vehicle to enable touch selection control to perform a function with the PCD 52 so that the driver does not have to enter data directly into the PCD 52. In one example, the APIM 45 may be implemented as part of the SYNC® system developed by Ford Motor Company® and Microsoft®. Switches may be positioned on the APIM 45, the vehicle's steering wheel (not shown) or on the device 12 to enable touch input.

In general, the APIM 45 may be configured to prevent calls from being received under certain conditions (or mask the presence of an incoming call). The device 12 may transmit a signal DRIVER_STATUS_1 indicating that the driver of the vehicle is the secondary driver to the APIM 45. If this is the case, then the APIM 45 transmits a signal REJECT to the PCD 52 to reject an incoming call since the secondary driver is detected to be driving the vehicle. In this case, the PCD 52 transmits a signal INCOMING_CALL to the APIM 45. In response, the APIM 45 transmits the signal REJECT to the PCD 52 to such that the call is rejected and does not provide notice or a notification to the driver that a call is being received. This feature can be activated by the primary driver via the switches 16 and/or voice command 18 (i.e., if the vehicle detects that the driver of the vehicle is the primary driver via the signal DRIVER_STATUS from the ignition key device 28). In the event the primary driver enables this feature, then the device 12 prevents the secondary driver from disabling this feature when the secondary driver is detected to be driving the vehicle. The notification of the incoming call may be provided after the PCD 52 is no longer operably coupled to the APIM 45. Alternatively, the PCD 52 may provide the notification (or a notice that a call was received) when ignition status is in an OFF state. In this case, the device 12 may transmit the signal IGN_SW_STS to the APIM 45. In turn, the APIM 45 may wirelessly transmit the signal IGN_SW_STS to the PCD 52 to communication ignition status. If the ignition status indicates that the vehicle is in the OFF position, then the PCD 52 may provide a notification to the secondary driver (or primary driver) that a call was received and also indicate the time, etc. or other data related to the call being received.

The APIM 50 may also prevent calls from being received on additional factors that are not based on driver status. For example, the APIM 50 may reject a call if the gap between the vehicle and another vehicle positioned in front of the vehicle is below a predetermined threshold and the signal GAP_EVENT is active. Likewise, the APIM 50 may reject a call if a forward collision event is active (i.e., signal FCW_EVENT is active), a blind spot monitoring event cross traffic alert is active (i.e., signal BSM indicates blind spot monitoring or cross traffic alert is active), a rear collision event is active (i.e., signal RCW_EVENT is active), a rear collision event is active (i.e., signal RCW_EVENT is active), a high density traffic condition is detected via a signal HDTC as transmitted from the device 12, vehicle speed exceeds a predetermined vehicle speed, and/or transmission status (or park brake status) indicates that the vehicle is in a non-park mode.

The APIM 45 may allow incoming calls to be received in an effort to revive the driver when the driver is detected to be drowsy. For example, the APIM 45, upon receiving the signal DIMON or CAMERA_STS (i.e., each signal providing an indication as to the drowsy state of the driver) may enable an incoming call to revive the driver. This may be done irrespective of the driver status of the driver. Alternatively, the APIM 45 may control the PCD 52 to alarm the driver or to contact an emergency contact in the event the driver is detected to be drowsy.

Figure 2:
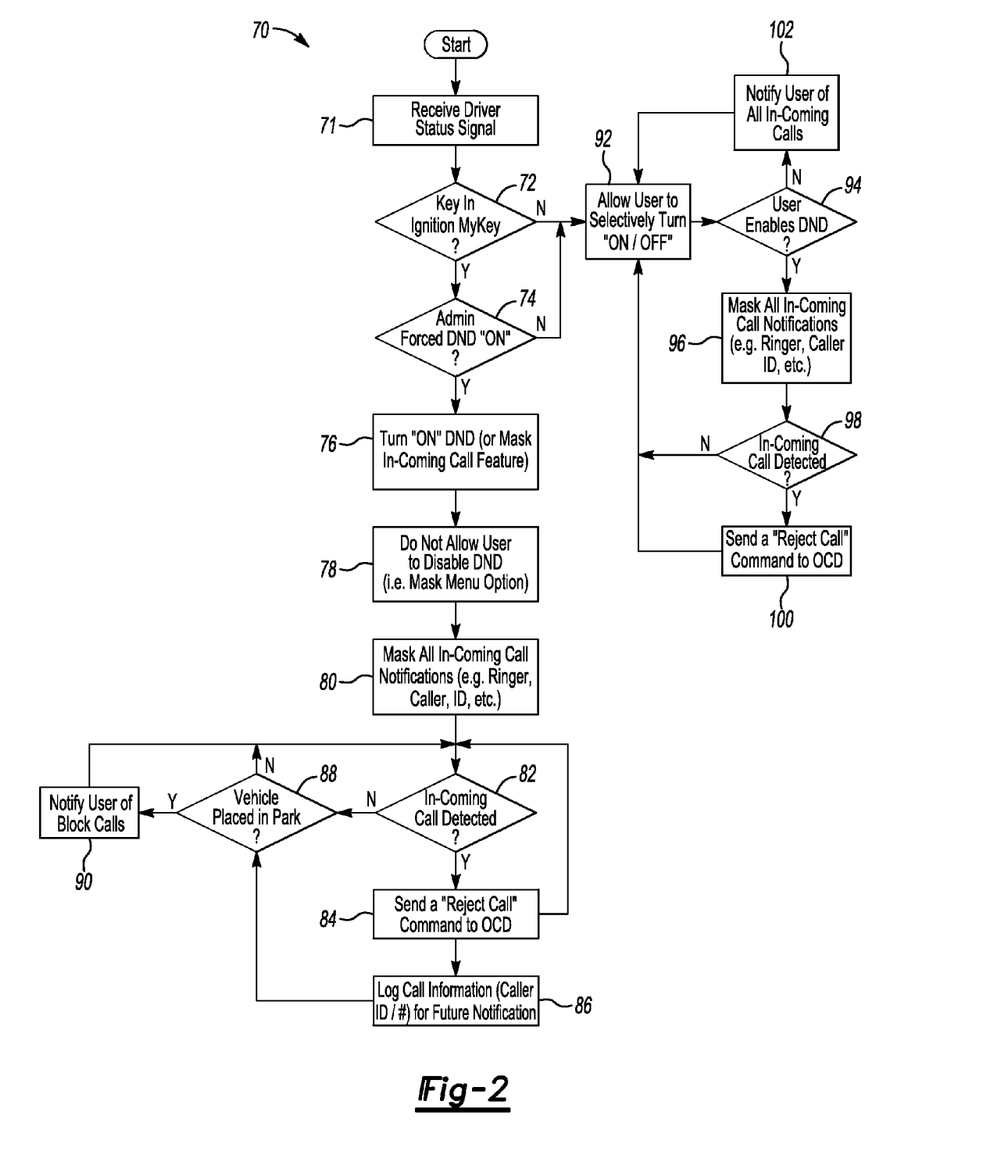
FIG. 2 depicts a method for masking incoming calls based on driver status in accordance to one embodiment.

FIG. 2 depicts a method 70 for masking incoming calls based on driver status in accordance to one embodiment.

In operation 71, the APIM 45 receives the signal DRIVER_STATUS_1 which indicates whether the driver is the primary driver or the secondary driver.

In operation 72, the APIM 45 determines whether the signal DRIVER_STATUS_1 corresponds to the primary driver or the secondary driver. If the primary driver is detected, then the method 70 moves back to operation 71. If the secondary driver is detected, then the method 70 moves to operation 74.

In operation 74, the APIM 45 determines whether the primary driver activated the mask in-coming call operation for the secondary driver. The APIM 45 receives a signal DND_ACTIVE from the device 12 to determine if the mask incoming call is active. If so, then the method 70 moves to operation 76. If not, then the method 70 moves to operation 92.

In operation 76, the APIM 45 activates the operation of masking an in-coming call.

In operation 78, the device 12 prevents the secondary driver from disabling the operation of masking an in-coming call.

In operation 80, the APIM 45 is programmed to mask any incoming call (or notifications of incoming calls such as the ringer, caller ID, etc.) on the PCD 52 after activation.

In operation 82, the APIM 45 determines whether an incoming call is being received from the PCD 52 via the signal INCOMING_CALL. If so, then the method 70 moves to operation 84. If not, then the method 70 moves to operation 88.

In operation 84, the APIM 45 transmits the signal REJECT to the PCD 52 such that the PCD 52 rejects the incoming call. The PCD 52 may not provide a notification to the secondary driver that an in-coming call is being made.

In operation 86, the PCD 52 saves the call information and provides such data at a later point in time.

In operation 88, the APIM 45 determines whether the vehicle is in park. If so, then the method 70 moves to operation 90. If not, then the method 70 moves to operation 82.

In operation 90, the APIM 45 transmits a control signal to the PCD 52 such that the PCD 52 notifies the secondary driver that a call was received and the relevant information related to the call.

In operation 92, the device 12 allows the primary driver to selectively enable/disable the operation of masking in-coming calls for himself/herself.

In operation 94, the APIM 45 determines whether the primary driver activated the operation of masking the in-coming call for himself/herself. If so, then the method 70 moves to operation 96. If not, then the method 70 moves to operation 102.

In operation 96, the APIM 45 is programmed to mask any incoming call (or notifications of incoming calls such as the ringer, caller ID, etc.) on the PCD 52.

In operation 98, the APIM 45 determines whether an incoming call is being received via the signal INCOMING_CALL. If so, then the method 70 moves to operation 100. If not, then the method 70 moves to operation 92.

In operation 100, the APIM 45 transmits the signal REJECT to the PCD 52 such that the PCD 52 rejects the incoming call. The PCD 52 may not provide a notification to the primary driver that an in-coming call is being made.

In operation 102, the APIM 45 allows all incoming calls from the PCD 52.

Figure 3:
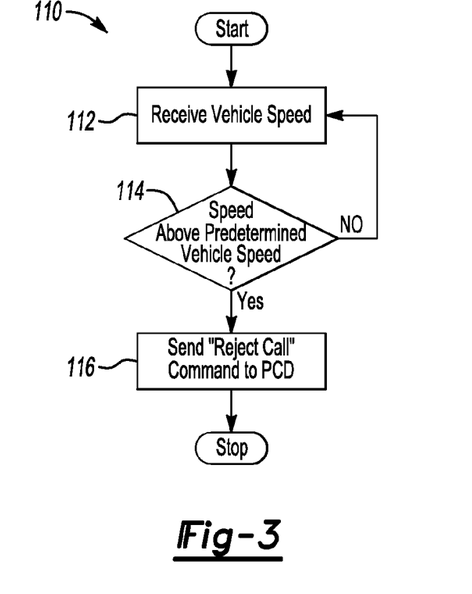
FIG. 3 depicts a method for masking incoming calls based on speed of the vehicle in accordance to one embodiment.

FIG. 3 depicts a method 110 for masking incoming calls based on speed of the vehicle in accordance to one embodiment.

In operation 112, the APIM 45 receives the signal VEH_SPEED from the device 12.

In operation 114, the APIM 45 determines whether the speed as indicated on the signal VEH_SPEED is greater than a predetermined speed threshold (e.g., 5 mph). If so, then the method 110 moves to operation 116. If not, then the method 110 moves to operation 112.

In operation 116, the APIM 45 transmits the signal REJECT to the PCD 52 such that the PCD 52 rejects any incoming calls while the vehicle speed exceeds the predetermined speed threshold. The PCD 52 may not provide a notification to the driver (primary or secondary) that an in-coming call is being made while the vehicle speed exceeds the predetermined speed threshold.

Figure 4:
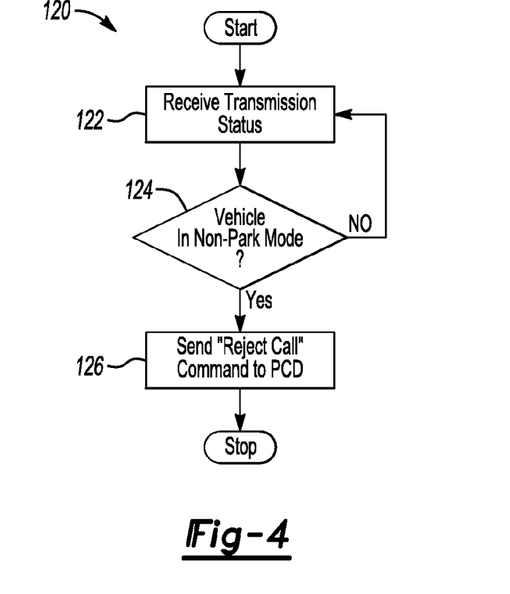
FIG. 4 depicts a method for masking incoming calls based on transmission status of the vehicle in accordance to one embodiment.

FIG. 4 depicts a method 120 for masking incoming calls based on transmission status of the vehicle in accordance to one embodiment.

In operation 122, the APIM 45 receives the signal TRANS_STATUS (or PARK_BK_STS) from the device 12.

In operation 124, the APIM 45 determines whether the vehicle is in a park mode or a non-park mode. If the vehicle is in the park mode, the method 120 moves back to operation 122. If not, then the method 120 moves to operation 126.

In operation 126, the APIM 45 transmits the signal REJECT to the PCD 52 such that the PCD 52 rejects any incoming calls while the vehicle is in the non-park mode. The PCD 52 may not provide a notification to the driver (primary or secondary) that an in-coming call is being made while the vehicle is in the non-park mode.

Figure 5:
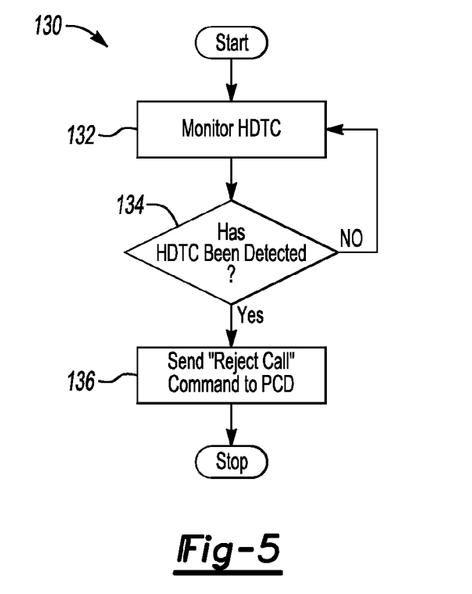
FIG. 5 depicts a method for masking incoming calls based on the vehicle being in a high density traffic condition in accordance to one embodiment.

FIG. 5 depicts a method 130 for masking incoming calls based on the vehicle being in a high density traffic condition.

In operation 132, the APIM 45 monitors for the signal HDTC as received from the device 12.

In operation 134, the APIM 45 determines whether the vehicle is in the high density traffic condition based on the signal HDTC. If so, then the method 130 moves to operation 136. If not, then the method 130 moves back to operation 132.

In operation 136, the APIM 45 transmits the signal REJECT to the PCD 52 such that the PCD 52 rejects any incoming calls while the vehicle is in the high density traffic condition. The PCD 52 may not provide a notification to the driver (primary or secondary) that an in-coming call is being made while the vehicle is in the high density traffic condition.

Figure 6:
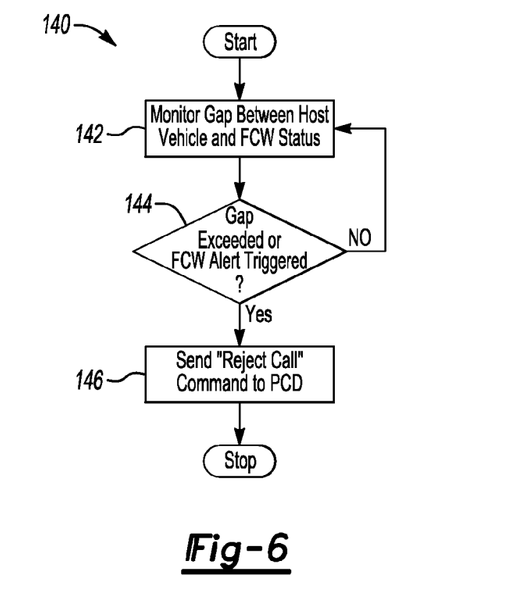
FIG. 6 depicts a method for masking incoming calls based on a gap between the vehicle and a first vehicle or on a forward collision alert in accordance to one embodiment.

FIG. 6 depicts a method 140 for masking incoming calls based on the gap between the vehicle and a first vehicle positioned ahead of the vehicle.

In operation 142, the APIM 45 monitors for the signal GAP_EVENT which is indicative of the vehicle being too close to a first vehicle that is positioned ahead of the vehicle or for the signal FCW_ALERT which indicates if the vehicle is on a path that may lead to a front collision.

In operation 144, the APIM 45 determines whether the vehicle is too close to the first vehicle based on the signal GAP_EVENT or if the FCW condition is active. If the vehicle is too close or the FCW condition is active, then the method 140 moves to operation 146. If not, then the method 140 moves to operation 142.

In operation 146, the APIM 45 transmits the signal REJECT to the PCD 52 such that the PCD 52 rejects any incoming calls while the vehicle is positioned too close to the first vehicle. The PCD 52 may not provide a notification to the driver (primary or secondary) that an in-coming call is being made.

Figure 7:
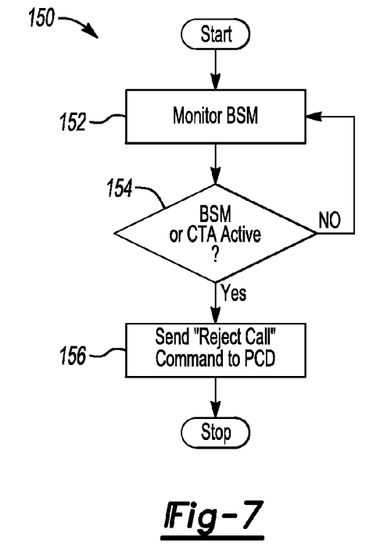
FIG. 7 depicts a method for masking incoming calls based on a blind spot monitoring or cross traffic alert event in accordance to one embodiment.

FIG. 7 depicts a method 150 for masking incoming calls based on a blind spot monitoring or cross traffic alert condition in accordance to one embodiment.

In operation 152, the APIM 45 monitors for the signal BSM/CSA which is indicative of a blind spot monitoring or cross traffic alert event.

In operation 154, the APIM 45 determines whether the vehicle is experiencing a blind spot monitoring or cross traffic alert event based on the signal BSM/CSA. If this condition is true, then the method 150 moves to operation 156. If not, then the method 150 moves back to operation 152.

In operation 156, the APIM 45 transmits the signal REJECT to the PCD 52 such that the PCD 52 rejects any incoming calls while the vehicle is experiencing a blind spot monitoring event or cross traffic alert event. The PCD 52 may not provide a notification to the driver (primary or secondary) that an in-coming call is being made while the vehicle is experiencing a blind spot monitoring event or cross traffic alert.

Figure 8:
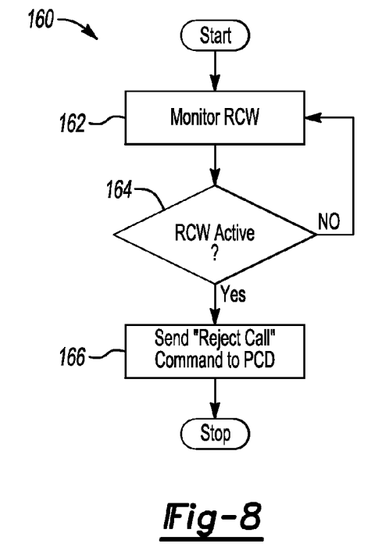
FIG. 8 depicts a method for masking incoming calls based on a rear collision event in accordance to one embodiment.

FIG. 8 depicts a method 160 for masking incoming calls based on a rear collision event in accordance to one embodiment.

In operation 162, the APIM 45 monitors for the signal RCW_EVENT which is indicative of the vehicle being on a path that may lead to a rear collision so that a warning can be issued to prevent an actual rear collision.

In operation 164, the APIM 45 determines whether the vehicle is on a course that may result in a rear collision based on the signal RCW_EVENT. If this condition is true, then the method 160 moves to operation 166. If not, then the method 160 moves back to operation 162.

In operation 166, the APIM 45 transmits the signal REJECT to the PCD 52 such that the PCD 52 rejects any incoming calls while the vehicle is experiencing a rear collision event. The PCD 52 may not provide a notification to the driver (primary or secondary) that an in-coming call is being made while the vehicle is experiencing a rear collision event.

Figure 9:
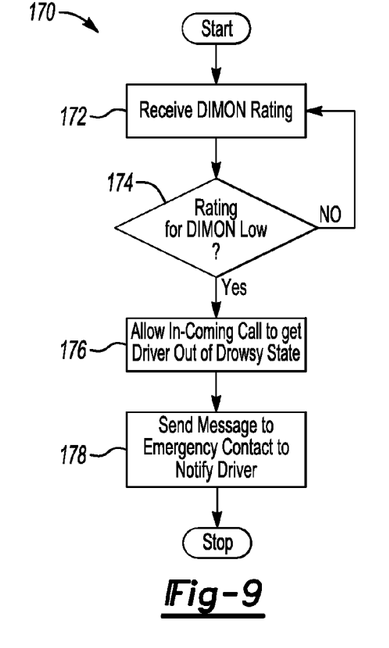
FIG. 9 depicts a method for allowing an incoming call based on a driver impairment measurement in accordance to one embodiment.

FIG. 9 depicts a method 170 for allowing an incoming call based on a DIMON rating in accordance to one embodiment. As noted above, it may be desirable to allow an in-coming call in the event the driver is experiencing a drowsy state such that the incoming call alerts or wakes up the driver.

In operation 172, the APIM 45 monitors data as received on the signal DIMON.

In operation 174, the APIM 45 determines whether the data on the signal DIMON is indicative of the driver being in a drowsy state. If this condition is true, then the method 170 moves to operation 176. If not, then the method 170 moves to operation 172.

In operation 176, the APIM 45 allows the PCD 52 to provide the incoming call to the vehicle in an attempt to get the driver (primary or secondary) out of the drowsy state.

In operation 178, the APIM 45 automatically and wirelessly controls the PCD 52 to contact an emergency contact to the driver in the event an incoming call is not being received (or picked up) at the time the DIMON rating indicates that the driver may be in a drowsy state.

Figure 10:
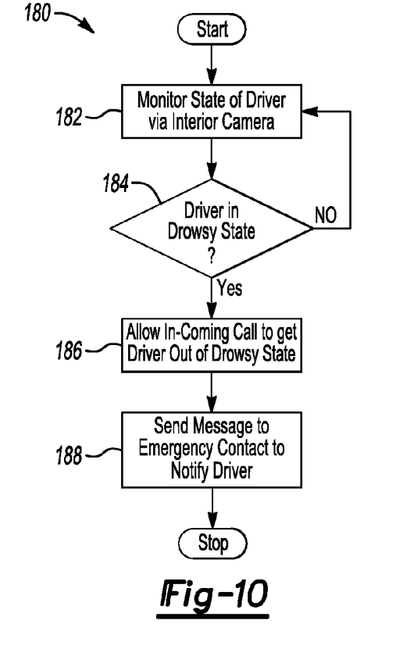
FIG. 10 depicts a method for allowing incoming calls based a detected drowsy state of the driver in accordance to one embodiment.

FIG. 10 depicts a method 180 for allowing an incoming call based on an alertness state of the driver in accordance to one embodiment. As noted above, it may be desirable to allow an in-coming call in the event the driver is experiencing a drowsy state such that the incoming call alerts or wakes up the driver.

In operation 182, the APIM 45 monitors data as received on the signal CAMERA_STS.

In operation 184, the APIM 45 determines whether the data on the signal CAMERA_STS is indicative of the driver (primary or secondary) being in a drowsy state. As noted above, the interior camera 49 captures and processes images related to the alertness of the driver. The signal CAMERA_STS may provide information that the driver is drowsy. If this condition is true, then the method 180 moves to operation 186. If not, then the method 180 moves back to operation 182.

In operation 186, the APIM 45 allows the PCD 52 to provide the incoming call to the vehicle in an attempt to get the driver (primary or secondary) out of the drowsy state.

In operation 188, the APIM 45 automatically and wirelessly controls the PCD 52 to contact an emergency contact to the driver in the event an incoming call is not being received (or picked up) at the time the signal CAMERA_STS indicates that the driver may be in a drowsy state.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for masking an incoming call from a portable communication device (PCD) in a vehicle, the apparatus comprising:
   a controller configured to:
      receive a driver status signal indicative of a driver being one of a primary driver and a secondary driver;
      transmit a first signal to a PCD to block a notification of an incoming call in the event the driver status signal indicates that the driver is the secondary driver; and
      transmit an ignition status signal indicative of the vehicle being in one of an operational mode and a non-operational mode to the PCD to enable the PCD to provide the notification of the incoming call after the incoming call was blocked in the event the vehicle is in the non-operational mode.

2. The apparatus of claim 1 wherein the controller is further configured to receive a vehicle speed signal indicative of vehicle speed and to transmit the first signal to the PCD to block the notification of the incoming call in the event the vehicle speed exceeds a predetermined vehicle speed and the driver status signal indicates that the driver is the primary driver.

3. The apparatus of claim 1 wherein the controller is further configured to receive a transmission status signal indicative of the vehicle being in one of a moving state and a non-moving state and to transmit the first signal to the PCD to block the notification of the incoming call in the event the transmission status signal indicates that the vehicle is in the moving state and the driver status signal indicates that the driver is the primary driver.

4. The apparatus of claim 1 wherein the controller is further configured to receive a traffic condition signal indicative of the vehicle being in one of a low density traffic condition and a high density traffic condition and to transmit the first signal to the PCD to block the notification of the incoming call in the event the traffic condition signal indicates that the vehicle is in the high density traffic condition and the driver status signal indicates that the driver is the primary driver.

5. The apparatus of claim 1 wherein the controller is further configured to receive a blind spot monitoring signal indicative of a first vehicle being in a blind spot of the vehicle and to transmit the first signal to the PCD to block the notification of the incoming call in the event the first vehicle is in the blind spot of the vehicle and the driver status signal indicates that the driver is the primary driver.

6. The apparatus of claim 1 wherein the controller is further configured to receive a collision warning signal indicative of the vehicle being on a path that may lead to a collision and to transmit the first signal to the PCD to block the notification of the incoming call in the event the vehicle is on a path that may lead to a collision and the driver status signal indicates that the driver is the primary driver.

7. The apparatus of claim 1 wherein the controller is further configured to receive a second signal indicative of a drowsy state of the driver and to allow the PCD to receive notification of the incoming call in the event the second signal indicates that the driver is in the drowsy state.

8. An apparatus for interfacing with a portable communication device (PCD), the apparatus comprising:
   a controller in a vehicle and configured to:
      receive a first signal indicative of a driver being in a drowsy state; and
      transmit a second signal to the PCD to enable the PCD to receive a notification of an incoming call in the event the first signal indicates that the driver is in the drowsy state while the vehicle is in motion.

9. The apparatus of claim 8 wherein the controller is further configured to transmit an ignition status signal indicative of the vehicle being in one of an operational mode and a non-operational mode to the PCD to enable the PCD to provide the notification of the incoming call if the incoming call was previously blocked in the event the vehicle is in the non-operational mode.

10. The apparatus of claim 8 wherein the controller is further configured to receive a collision warning signal indicative of the vehicle being on a path that may lead to a collision and to transmit a third signal to the PCD to block notification of the incoming call in the event the vehicle is on a path that may lead to a collision.

11. The apparatus of claim 8 wherein the controller is further configured to receive a driver status signal indicative of a driver being one of a primary driver and a secondary driver and to transmit a third signal to the PCD to block notification of the incoming call in the event the driver status signal indicates that the driver is a secondary driver.

12. The apparatus of claim 8 wherein the controller is further configured to receive a blind spot monitoring signal indicative of a first vehicle being in a blind spot of the vehicle and to transmit a third signal to the PCD to block the notification of the incoming call in the event the first vehicle is in the blind spot of the vehicle.

13. An apparatus for masking an incoming call from a portable communication device (PCD) in a vehicle, the apparatus comprising:
    a controller configured to:
        receive an ignition status signal indicative of the vehicle being in one of an operational mode and a non-operational mode;
        receive a vehicle speed signal indicative of vehicle speed;
        transmit a first signal to the PCD to block a notification of the incoming call in the event the vehicle speed exceeds a predetermined vehicle speed; and
        transmit a second signal to the PCD to enable the PCD to provide the notification of the incoming call after the incoming call was blocked in the event the vehicle is in the non-operational mode.

14. The apparatus of claim 13 wherein the controller is further configured to receive a driver status signal indicative of a driver being one of a primary driver and a secondary driver and to transmit the first signal to the PCD to block notification of the incoming call in the event the driver status signal indicates that the driver is the secondary driver.

15. The apparatus of claim 13 wherein the controller is further configured to receive a blind spot monitoring signal indicative of a first vehicle being in a blind spot of the vehicle and to transmit the first signal to the PCD to block notification of the incoming call in the event the first vehicle is in the blind spot of the vehicle.

16. The apparatus of claim 13 wherein the controller is further configured to receive a second signal indicative of a drowsy state of a driver and to allow the PCD to receive notification of the incoming call in the event the second signal indicates that the driver is in the drowsy state.

* * * * *